United States Patent [19]

Stuart et al.

[11] Patent Number: 4,704,431
[45] Date of Patent: Nov. 3, 1987

[54] BLENDS OF POLYPROPYLENE AND VINYLAROMATIC/α-METHYLSTYRENE COPOLYMERS

[75] Inventors: Van I. W. Stuart, Missouri City, Tex.; Duane B. Priddy, Midland, Mich.

[73] Assignee: The Dow Chemical Company, Midland, Mich.

[21] Appl. No.: 848,140

[22] Filed: Apr. 4, 1986

[51] Int. Cl.$^4$ .................... C08L 23/12; C08L 25/16; C08L 51/04; C08L 51/06
[52] U.S. Cl. ....................................... 525/75; 525/70; 525/86; 525/931
[58] Field of Search ................................... 525/70, 75

[56] References Cited

U.S. PATENT DOCUMENTS 4,386,187 5/1983 Grancio et al. ................... 525/96
4,490,508 12/1984 Nagano et al. ................... 525/70

FOREIGN PATENT DOCUMENTS 57-135845 8/1982 Japan .

OTHER PUBLICATIONS

"Interfacial Agents (Compatibilizers) for Polymer Blends"—Paul—Polymer Blends, vol. 2—1978.
Robeson—Applications of Polymer Blends: Emphasis on Recent Advances—Poly. Eng. & Sci., Jun. 1984, vol. 24, No. 8, pp. 587–591.

Primary Examiner—Carman J. Seccuro
Attorney, Agent, or Firm—Douglas N. Deline

[57] ABSTRACT

A polymer resin comprising a blend of polypropylene, a copolymer of a vinylaromatic monomer and α-methylstyrene prepared by anionic polymerization at a temperature above 61° C. and a monovinylidene aromatic polymer grafted α-olefin copolymer compatibilizing agent.

4 Claims, No Drawings

BLENDS OF POLYPROPYLENE AND VINYLAROMATIC/α-METHYLSTYRENE COPOLYMERS

BACKGROUND OF THE INVENTION

This invention relates to a polymer blend comprising polypropylene, an amount of a vinylaromatic/α-methylstyrene copolymer prepared by anionic polymerization at a temperature above the ceiling temperature of α-methylstyrene and, as a compatibilizer, an amount of an α-olefin copolymer rubber which has graft polymerized thereto an amount of a monovinylidene aromatic polymer. These polymer blends have very attractive combinations of properties, including thermoformability, moldability, resistance to naturally-occurring organic substances which tend to accelerate the degradation of some thermoplastic resin parts (e.g., fats and greases), ductility, low cost, and other characteristics. Such combinations of properties make these compositions useful for applications such as packaging, disposable containers and the like. The blends have many of the advantages of the constituent polymers and may be shaped into products by many of the known thermoplastic forming techniques, such as thermoforming, injection molding, stamping, forging, solid phase forming, rotary molding or the like.

Copolymers of a vinylaromatic monomer and α-methylstyrene prepared by anionic polymerization at a temperature above the ceiling temperature of α-methylstyrene (61° C.) have been previously known in the art. A suitable process for their manufacture has been disclosed in EP No. 87,165. Because the most commonly available vinylaromatic monomer is styrene such copolymers are generically referred to as SAMS copolymers.

Such copolymers are very easily thermoformed and exhibit good impact strength and low temperature properties when thermoformed. In addition, SAMS copolymers have desirable high temperature properties. Because of their higher melt temperature, SAMS copolymers may be exposed to temperatures over 100° C. without deformation.

Disadvantageously, however, SAMS copolymers have poor environmental stress crack resistance (ESCR). Environmental stress cracking occurs when molded resin parts are subjected to conditions where the part is both placed under stress and exposed to a fat- or grease-containing substance. These conditions occur commonly where materials such as grease- or fat-containing foods are packaged in a molded container. The presence of the grease or fat in the food in combination with the stress placed on the container, associated with filling, sealing and handling, cause such containers to become weakened and easily damaged.

Polypropylene, on the other hand, has relatively good resistance to the action of fats and greases and, therefore, is very desirable for the manufacture of containers for foods and similar materials. However, when it comes to manufacturing or forming techniques, polypropylene is much less versatile than SAMS copolymers. As is known, polypropylene, due to its relatively sharp melting point, is very difficult to thermoform.

While it might seem relatively straight forward to combine the two types of polymers to achieve a blend having desirable combinations of properties, the blending of these two polymers is complicated by the fact that the two resins are incompatible.

In general, it is known that it may be possible to form a blend of two otherwise incompatible resins by the use of a so-called compatibilizing agent. For examples of earlier attempts to blend olefin polymer and monovinylidene aromatic polymer resins see U.S. Pat. Nos. 4,386,187 and 4,386,188 to Grancio et al., the teachings of which are incorporated herein by reference, where a major amount of a crystalline olefin polymer is blended with a minor amount of an amorphous polymer and a block copolymer compatibilizer such as a styrene-butadiene-styrene block copolymer. See also European Patent Application Nos. 60,524 and 60,525, both filed Mar. 11, 1982, where styrene-butadiene block copolymers are used to compatibilize blends of an olefin polymer and a high impact polystyrene. In Japanese Patent Announcement Kokai No. 49-28627/1974, olefin and styrene-type resins are blended together with styrene-butadiene block copolymers. Japanese Patent Announcement Kokai No. 48-43031/1973 also teaches blends of a polyolefin, an aromatic vinyl polymer and a polymer selected from the group consisting of styrene-butadiene block copolymers, ethylene-vinyl acetate copolymers, ethylene-acrylic acid ester copolymers and ethylene-methacrylic acid ester copolymers. In European Patent Application No. 60,525 and U.S. Pat. No. 4,188,432, a hydrogenated styrene-butadiene-styrene block copolymer (i.e., styrene-ethylene-butylene-styrene type polymer) is blended with styrenic and olefinic polymers. Hydrogenated styrene-butadiene diblock copolymers (i.e., styrene-ethylene-butylene type polymers) have also been blended with amounts of olefinic and styrenic polymers. See, for example, British Pat. No. 1,363,466; U.S. Pat. No. 4,020,025; Japanese Pat. No. 81-38,338; German Pat. No. 241,375.

However, these general approaches to olefin-/monovinylidene aromatic polymer blends provide insufficient property combinations and have other undesirable limitations, such as the amounts of the monovinylidene aromatic and olefinic polymers which can be blended. Moreover, previously known blends have failed to provide a composition having improved high temperature properties.

SUMMARY OF THE INVENTION

According to the present invention, there is provided a polymer blend composition comprising:

(a) from about 15 to about 85 weight percent polypropylene, said weight percent being based on the weight of components (a), (b) and (c);

(b) from about 15 to about 85 weight percent of a vinylaromatic/α-methylstyrene copolymer prepared by anionic polymerization at a temperature above 61° C. based on the weight of components (a), (b) and (c); and (c) a compatibilizing amount of a monovinylidene aromatic polymer-grafted α-olefin copolymer.

The blends according to the present invention contain at least about 15 percent by weight polypropylene. Preferably the blends according to the present invention contain from about 20 to about 90 weight percent polypropylene, more preferably the blends contain from about 40 to about 75 weight percent polypropylene and most preferably from about 55 to about 75 weight percent. These weight percentages of polypropylene polymer are based on the total weight of the blend.

The vinyl aromatic monomers employed to prepare the copolymers used in the present invention include styrene and ring alkyl substituted styrene compounds containing up to about four $C_{1-4}$ alkyl substituents. Examples include styrene, 2-vinyl toluene, 3-vinyl toluene, 4-vinyl toluene, t-butyl styrene, etc., as well as mixtures of such vinyl aromatic monomers. A preferred vinyl aromatic monomer is styrene.

The copolymers employed in the present invention are prepared by anionic polymerization. Where a feed stream is employed containing high amounts of α-methylstyrene, the styrene α-methylstyrene copolymers prepared according to the present invention contain nearly the theoretical maximum amount of α-methylstyrene, i.e. a ratio of nearly two α-methylstyrene units for each vinyl aromatic monomer unit. In the styrene/α-methylstyrene system this molar ratio of 2/3 α-methylstyrene results in a weight percent of α-methylstyrene of approximately 70. Additional amounts of α-methylstyrene are not believed to be incorporated under the polymerization conditions chosen due to the thermodynamically favored formation of two repeating monomer units in the polymer chain during the reaction. Accordingly, it may be seen that generally no more than two α-methylstyrene monomer units are located adjacent to one another in the resulting polymer. Of course, reduced amounts of α-methylstyrene may be employed, if desired, resulting in a random copolymer containing a statistical distribution of vinyl aromatic monomer and α-methylstyrene monomer units less than the above maximum α-methylstyrene content. The copolymers employed in the present invention are further characterized by a random distribution of vinyl aromatic monomer remnants and α-methylstyrene remnants. Preferably, the copolymers, employed in the present invention contain at least about 5 percent α-methylstyrene units by weight and preferably, at least about 20 percent α-methylstyrene units by weight. The weight average molecular weight of the copolymers is at least about 40,000 and preferably at least about 100,000. In determination of molecular weights of the copolymers used herein, the technique of size exclusion chromatography is employed and the value obtained is a comparative value to that of a polystyrene molecule that would occupy the same volume as that of the polymer molecule being measured. The resulting copolymers are stable at elevated temperature conditions and demonstrate good heat distortion properties.

The term "ceiling temperature" employed herein means the temperature above which the polymerization of the α-methylstyrene to form high molecular weight homopolymers is thermodynamically disfavored compared to the reverse depolymerization process. However, α-methylstyrene, which has a homopolymerization ceiling temperature of about 61° C., will form oligomeric reaction products, especially and even essentially the dimer thereof under anionic polymerization conditions at a temperature above 61° C. Other monomers usually possess ceiling temperatures that are higher than 61° C. Styrene, in particular has a homopolymerization ceiling temperature of about 350° C. Thus, thermodynamically stable copolymers of vinyl aromatic monomers and α-methylstyrene are formed under anionic polymerization conditions at a temperature above about 61° C. comprising, in general, no more than two adjacent α-methylstyrene polymerization moieties.

The anionic polymerization may be initiated by use of an organometallic anionic polymerization initiating compound according to well-known techniques. Suitable organometallic anionic polymerization initiating compounds are previously known and disclosed in the art. Such known compounds include the alkyl lithiums and other alkali metal derivatives of aromatic or aliphatic compounds. A preferred initiator is n-butyllithium.

In the polymerization, the initiator is added to an anionically polymerizable monomer mixture retained under polymerization conditions. Suitably, a back mixed reactor, such as a stirred tank reactor, may be employed and the monomers continuously added to the reactor and the reaction mixture discharged from the reactor at about the same rate as the monomers are added. Alternatively, a continuously recirculated coil back mixed reactor may be employed or additional reactors employed as are known in the art. In practice, an upper temperature limit on the polymerization is around 200° C.

As is previously known, monomers for use in anionic polymerizations may be first purified by suitable purification means such as by distillation, the use of molecular sieve beds, etc., in order to remove contaminants that would interfere with the initiator. Alternatively, aluminum alkyl scavenging agents such as those disclosed in U.S. Pat. No. 4,239,870, may be employed in order to purify the ingredients of the polymerization mixture. The highly purified monomers along with an inert solvent, if desired, are then charged to a reaction vessel and the reactor sealed and heated to a temperature above the ceiling temperature of α-methylstyrene. Suitable solvents are those previously known in the art exemplified by cyclohexane, benzene, ethylbenzene, toluene, etc. In a desirable operating embodiment, an excess of α-methylstyrene may be employed. In as much as the excess α-methylstyrene is not incorporated into the final copolymer due to the aforementioned limitation imposed by the ceiling temperature, the same acts as the solvent for the reaction process. A preferred reaction mixture comprises on a weight basis from about 50 percent to about 99.5 percent α-methylstyrene and from about 50 percent to about 0.5 percent vinyl aromatic monomer.

The copolymer may be recovered from the reactor effluent by terminating the polymerization through addition of a chain terminating agent such as an alcohol and devolatization or precipitation of the resulting syrup.

Preferably, the blends according to the present invention comprise from about 20 to about 75 percent by weight SAMS, more preferably from about 25 to about 70 percent by weight SAMS, and most preferably from about 30 to about 60 percent.

The key to preparing desirable blends according to the present invention is the incorporation in the blends of the specific compatibilizer. The compatibilizer employed in the practice of the present invention is a monovinylidene aromatic polymer-grafted α-olefin copolymer. The substrate or base of the graft copolymer compatibilizer is a polymer of an α-olefin monomer having from 2 to 4 carbon atoms and at least one additional different polymerizable olefin monomer (which can be mono- or di-olefin) having from 3 to 16 carbon atoms. For example, the compatibilizer base can be a copolymer of ethylene and one additional α-olefin monomer having from 3 to 15 carbon atoms, preferably from 3 to 5 carbon atoms, for example, propylene. These copolymers are often generically referred to as EP rubbers or EP polymers.

In another embodiment of the present invention, the base for the graft copolymer compatibilizer is a terpolymer of ethylene, one or more mono-α-olefins having from 3 to 16 carbon atoms (e.g., propylene), and a non-conjugated diene monomer (e.g., 5-ethylidene-2-norbornene). Other exemplary non-conjugated dienes include 1,4-hexadiene and dicyclopentadiene. These terpolymeric substrates are often generically referred to as EPDM rubbers or EPDM polymers.

The substrate α-olefin copolymers generally comprise polymerized therein from about 20 to about 80 weight percent based on substrate weight of the $C_2$-$C_4$ α-olefin and from about 20 to about 80 weight percent of a different $C_3$-$C_{16}$ α-olefin. In the case of the preferred terpolymeric substrates such as EPDM polymers, from about 1 to about 15 weight percent of the third monomer is polymerized therein. Preferably, the substrate for the graft copolymer compatibilizer is an EPDM rubber comprising from about 25 to about 75 weight percent ethylene; from about 20 to about 65 weight percent higher α-olefin having from 3 to 16 carbon atoms; and from about 1 to about 10 weight percent nonconjugated diene polymerized therein, these weight percents being based on the total weight of the EPDM rubber.

The graft or superstrate portion of the graft copolymer compatibilizer is a monovinylidene aromatic polymer. Included are polymers or interpolymers which comprise, polymerized therein, at least about 50 percent by weight and preferably at least 90 percent by weight of one or more monovinylidene aromatic monomers represented by the following formula:

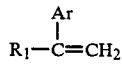

wherein $R_1$ is selected from the group of radicals consisting of hydrogen and alkyl radicals containing three carbons or less, and Ar is selected from the group of radicals consisting of phenyl, or alkylphenyl. Exemplary monovinylidene aromatic monomers include para-vinyl toluene and α-methylstyrene. Styrene is a particularly desirable monovinylidene aromatic monomer for the monovinylidene aromatic polymers used in the practice of the present invention.

The grafted monovinylidene aromatic polymer can be grafted onto the substrate by any of the grafting techniques generally known in the art. The preformed α-olefin copolymer can be contacted with the graftable monovinylidene aromatic monomer or monomers (and optional monomer(s) copolymerizable therewith) in a polymerization system of the well-known mass, mass-solution, suspension, mass-suspension or the like types. In general, the grafting reaction can be free radical (thermally, chemically or radiation initiated), anionic or Friedel-Crafts.

When grafting an EPDM rubber substrate, it has been found very advantageous to initially hydroperoxidize, utilizing singlet oxygen at least a portion of the double bonds present in the residually unsaturated α-olefin copolymer substrate. This may be accomplished by combining the substrate, a sensitizing compound such as methylene blue, oxygen and an optional solvent, then exposing this mixture to the light from a high pressure sodium vapor lamp. The α-olefin copolymer hydroperoxide formed in this manner can then be conveniently grafted at these hydroperoxide sites by a peroxy-compound-initiated grafting reaction. Other techniques for grafting monovinylidene aromatic polymer onto α-olefin copolymer substrates are taught in U.S. Pat. Nos. 3,489,822; 3,489,821; 3,642,950; 3,819,765; 3,538,190; 3,538,191; 3,538,192; 3,657,395; 3,671,608; 3,683,050; 3,876,727; and 4,340,669; the teachings of which patents are hereby incorporated herein by reference.

In order to achieve sufficient compatibilization of the monovinylidene aromatic and olefin polymer resins, there needs to be grafting of a sufficient amount of monovinylidene aromatic graft polymer onto the α-olefin copolymer substrate. The molecular weight of the grafted monovinylidene aromatic polymer also needs to be sufficient that molecular entanglements occur with the SAMS copolymer (e.g., about 20,000 for grafted polystyrene). Preferably, the molecular weight of the grafted monovinylidene aromatic polymer is about the same as the molecular weight of the SAMS copolymers. In a preferred method for the practice of the present invention, grafted monovinylidene aromatic polymer and the SAMS copolymer have very similar or identical molecular weights and compositions.

The actual degree of grafting of monovinylidene aromatic polymer onto the EP or EPDM rubber substrate can vary according to the amount of compatibilizer which is going to be used. If the graft copolymer compatibilizer is highly grafted with monovinylidene aromatic polymer, then less can be used to compatibilize the SAMS copolymer and polypropylene resins. Conversely, however, if the graft copolymer compatibilizing agent is lightly grafted with the monovinylidene aromatic polymer, then more of such compatibilizing agent needs to be included. It has generally been found that to get sufficient compatibilization, the degree of grafting in terms of the ratio of the weight of the grafted polymer to the weight of the substrate may vary from about 0.1 to about 2. Preferably, the degree of grafting is from about 0.7 to about 2. Within these ranges of grafting degrees, it has been found that from about 1 to about 20 percent by weight of the graft copolymer compatibilizer is desired in the blends according to the present invention, which weight percent is based on the total weight of the blend. Preferably, from about 2 to about 15 percent by weight of the compatibilizer is used and most preferably from about 4 to about 15 percent by weight. In general, the physical properties of the blends improve with increased concentration of compatibilizer.

Within the scope of the present invention, various other types of ingredients can be included in these blend compositions. Such other ingredients include fillers, pigments, flame retarding agents, and antistatic agents, antiblocking agents, uv stabilizers, and the like. There can also be included in the blends according to the present invention amounts of additional polymers which are compatible with the present blends. For example, amounts of elastomeric materials can be used to further improve the impact resistance of the blends. Such elastomeric materials include conjugated diene rubbers, such as polybutadiene and butadiene copolymers, and also additional amounts of EP or EPDM rubbers which are not grafted with monovinylidene aromatic polymer. Blends with the well known polyphenylene ethers are also readily prepared. In addition, blowing agents can be incorporated into the blends to produce foam structures. The above ingredients can be introduced in any of the components of the blend composition, can be introduced during the blending of the three components or can be introduced into the resultant blend in a separate operation.

The three components of the present invention, polypropylene, SAMS copolymer, and the compatibilizer, are normally separately prepared and then combined to produce the blends. Mixing techniques and devices suitable for the requisite melt blending of the ingredients of the present blends are well known in the art. Suitable devices include extruders which are equipped with mixing sections, Banbury mixers, twin-roll mills, or injection molders, etc.

EXAMPLES

In the following examples, blends according to the present invention are prepared containing polypropylene, SAMS copolymer and a grafted α-olefin rubber compatibilizer. These examples will illustrate the benefits achieved according to the practice of the present invention and are not to be construed as limiting, in as much as additional embodiments will become readily apparent to the skilled artisan.

EXAMPLE 1

A. Preparation of SAMS Copolymer

Copolymers of styrene and α-methylstyrene are prepared by anionic polymerization substantially according to the following process steps. A feed stream comprising α-methylstyrene, phenylacetylene free styrene and ethylbenzene solvent is distilled and contacted with an alumina bed to remove water, oxygen and benzaldehyde impurities. The purified feed stream is pumped to a 2-liter Paar reactor, equipped with a hollow auger agitator, the hollow auger comprising a cylinder slightly shorter in length than the interior of the reactor and slightly smaller in diameter. A land is helically disposed on the outside of the cylinder. The land is sized such that the cylinder generated by rotation of the hollow cylinder and land is slightly less than the internal volume of the reactor. Such an agitator is described in U.S. Pat. No. 4,239,863, the teachings of which are herewith incorporated by reference thereto. Hot water under pressure is employed to heat the reactor to 95° C. The purified feed stream and initiator are introduced into the side of the reactor at a rate to give a two-hour residence time. The initiator is normal-butyllithium pumped at a rate to provide a concentration of about 60 ppm. The pressure within the reactor is maintained at about 50 pounds per square inch gauge using a pressure control valve at the outlet. The stream from the reactor is fed to a terminator coil of 1 inch inside diameter, 316 Stainless Steel tubing connected in a square configuration and having an internal volume of about 467 cubic centimeters. Material is recirculated within the terminator coil while a solution of 1 weight percent ethanol in ethylbenzene is fed to the terminator coil at a rate about twice that of the normal-butyllithium fed to the polymerizing vessel. Effluent from the terminator coil is then pressure fed into a devolatilizer equipped with a flat plate heater and a screw extruder substantially according to that described in U.S. Pat. No. 3,014,702, the teachings of which is incorporated by reference thereto. The exterior of the heater is maintained at a pressure of less than 20 millimeters of mercury and the product mixture is heated to a temperature of about 250° C. to provide a polymer containing about 0.3 weight percent volatiles. The molecular weight of the resultant styrene α-methylstyrene polymer over a 24-hour period is maintained at plus or minus 5,000 of 212,000. By varying the amount of α-methylstyrene in the feed stream, the α-methylstyrene content of the resulting copolymer may be varied up to a maximum content of about 70 percent by weight.

B. Graft Copolymer Preparation

An ethylene/propylene/ethylidene norbornene (54/41.5/4.5 w/w %) terepolymer (15 g), sold under the tradename EPSYN 40A, is dissolved in dry cyclohexane (750 ml) at 70°–74° C. using a 1 liter glass flask equipped with a mechanical stirrer and dry nitrogen inlet. To the homogeneous solution is added by syringe 0.67 cc of a 18.5 weight percent solution of potassium t-amyloxide in cyclohexane followed by 0.45 cc of a 15 weight percent solution of n-butyllithium in cyclohexane. After stirring at 70°–74° C. for 20 minutes, carefully purified styrene (20 g) and α-methylstyrene (100 g) are added. An immediate exotherm occurs which carries the temperature up to 80° C. After 30 minutes, ethanol (2 cc) is added. The graft copolymer is isolated by precipitation by pouring the reaction mixture into an agitated beaker of methanol. The precipitated polymer is then dried overnight in a vacuum oven at 70° C. and 3 mm Hg.

C. Blend Preparation

The above prepared SAMS copolymer and graft copolymer are blended with polypropylene (Polypropylene 5052 available from Exxon Co. U.S.A.) using a Brabender ® mixer at 210° C. The relative proportions are:

| | |
|---|---|
| SAMS | 40.00 g |
| Polypropylene | 106.67 g |
| Graft Copolymer | 20.00 g |

After blending, the alloy is compression molded into test specimens. The vicat softening point of the specimens is found to be 139° C.

What is claimed is:

1. A polymer blend comprising:
    (a) from about 15 to about 85 weight percent polypropylene;
    (b) from about 15 to about 85 weight percent of a vinylaromatic/α-methylstyrene copolymer prepared by anionic polymerization at a temperature above 61° C.; and
    (c) a compatibilizing amount of a monovinylidene aromatic polymer-grafted α-olefin copolymer prepared by anionic graft polymerization said α-olefin copolymer comprising a polymer of an -olefin monomer having from 1 to 4 carbon atoms and at least one additional different polymerizable monoolefin monomer having from 3 to 16 carbon atoms.

2. A polymer blend according to claim 1, wherein component (b) is a styrene/α-methylstyrene copolymer.

3. A polymer blend according to claim 1, wherein the monovinylidene aromatic polymer grafted α-olefin copolymer is a grafted EPDM copolymer.

4. A polymer blend according to claim 3, wherein the monovinylidene aromatic-grafted EPDM copolymer is grafted with a copolymer of styrene and α-methylstyrene.

* * * * *